United States Patent
Ikeda et al.

(10) Patent No.: US 8,064,004 B2
(45) Date of Patent: Nov. 22, 2011

(54) LIQUID CRYSTAL DISPLAY APPARATUS AND PROCESS FOR MANUFACTURING THE SAME

(75) Inventors: Masaki Ikeda, Osaka (JP); Hisao Kawaguchi, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 332 days.

(21) Appl. No.: 12/444,781

(22) PCT Filed: Jul. 26, 2007

(86) PCT No.: PCT/JP2007/064695
§ 371 (c)(1),
(2), (4) Date: Apr. 8, 2009

(87) PCT Pub. No.: WO2008/081616
PCT Pub. Date: Jul. 10, 2008

(65) Prior Publication Data
US 2010/0053491 A1    Mar. 4, 2010

(30) Foreign Application Priority Data
Dec. 28, 2006 (JP) .................... 2006-354211

(51) Int. Cl.
*G02F 1/1335* (2006.01)
(52) U.S. Cl. ........................................ 349/57
(58) Field of Classification Search .............. None
See application file for complete search history.

(56) References Cited

U.S. PATENT DOCUMENTS

| | | | | |
|---|---|---|---|---|
| 5,267,066 | A * | 11/1993 | Nakai et al. | 349/110 |
| 2007/0035678 | A1* | 2/2007 | Yoo et al. | 349/54 |
| 2007/0126945 | A1* | 6/2007 | Tashiro | 349/54 |
| 2010/0201914 | A1* | 8/2010 | Ikeda | 349/62 |
| 2010/0238386 | A1* | 9/2010 | Yin et al. | 349/106 |

FOREIGN PATENT DOCUMENTS

| | | |
|---|---|---|
| JP | 4-301616 | 10/1992 |
| JP | 2005-189360 | 7/2005 |
| JP | 2005-345602 | 12/2005 |
| JP | 2007241067 A * | 9/2007 |
| WO | 2006/016463 A1 | 2/2006 |

OTHER PUBLICATIONS

International Search Report for PCT/JP2007/064695, mailed Aug. 21, 2007.

* cited by examiner

*Primary Examiner* — Sung Pak
(74) *Attorney, Agent, or Firm* — Nixon & Vanderhye P.C.

(57) ABSTRACT

A liquid crystal display apparatus, includes a liquid crystal display panel including a first substrate provided on a display light receiving side, and a second substrate provided on a display light exiting side so as to oppose the first substrate with a liquid crystal material interposed therebetween, the liquid crystal display panel having a bright dot defect portion therein, wherein: the first substrate includes a light-blocking portion formed in a region thereof corresponding to the bright dot defect portion; and the second substrate includes a light-collecting portion formed in a region thereof corresponding to the bright dot defect portion.

16 Claims, 4 Drawing Sheets

LIQUID CRYSTAL DISPLAY APPARATUS AND PROCESS FOR MANUFACTURING THE SAME

This application is the U.S. national phase of International Application No. PCT/JP2007/064695, filed 26 Jul. 2007, which designated the U.S. and claims priority to Japan Application No. 2006-354211, filed 28 Dec. 2006, the entire contents of each of which are hereby incorporated by reference.

TECHNICAL FIELD

The present invention relates to a liquid crystal display apparatus, and a process for manufacturing the same.

BACKGROUND ART

Typically, in a liquid crystal display apparatus, the orientation of liquid crystal molecules in each pixel portion is controlled by switching the presence/absence of an applied voltage across the liquid crystal layer in the pixel portion of the display screen so as to modulate the degree by which light is transmitted/scattered by the pixel portion, thereby displaying characters, images, etc., on the display screen.

In such a liquid crystal display apparatus, in a normally black mode, for example, where black display is achieved in the absence of applied voltage across the liquid crystal layer, there may occur shorting between wires and electrodes, defects of the TFT (thin film transistor) as a pixel switching element, etc., in each pixel portion. In such a case, a voltage remains to be applied across the liquid crystal layer in the pixel portion, and that pixel portion is seen as a tiny bright dot, resulting in a display defect. An orientation disturbance caused by a foreign particle, or the like, attached on the substrate surface also causes light leakage, which is seen as a tiny bright dot, resulting in a display defect.

As a technique addressing such a display defect, Patent Document 1, for example, discloses a liquid crystal display apparatus, in which a concave portion is formed at a position on the surface of at least one of a pair of substrates that is opposite to the liquid crystal layer side, the surface position optically coinciding with the portion of a bright dot defect, wherein a light-blocking material is provided on the inside of the concave portion, and the concave portion with the light-blocking material thereon is filled with a curable resin to thereby flatten the surface thereof. It describes that a bright dot defect can be repaired without requiring special equipment or complicated work and without causing defects such as bubbles between the polarizer and the liquid crystal panel.

Patent Document 1: Japanese Laid-Open Patent Publication No. 2005-189360

DISCLOSURE OF THE INVENTION

Problems to be Solved by the Invention

However, when one attempts to repair a bright dot defect by a technique described above, the light-blocking material used as a filling for blocking leaking light is seen as a black dot in the display section. The bigger the black dot is, the more adverse the influence is on the display state of the display section.

Means for Solving the Problems

It is an object of the present invention to provide a liquid crystal display apparatus in which a bright dot defect is desirably suppressed while reducing the size of a black dot occurring due to the repair of a bright dot defect, and a process for manufacturing the same.

A liquid crystal display apparatus of the present invention includes a liquid crystal display panel including a first substrate provided on a display light receiving side, and a second substrate provided on a display light exiting side so as to oppose the first substrate with a liquid crystal material interposed therebetween, the liquid crystal display panel having a bright dot defect portion therein, wherein: the first substrate includes a light-blocking portion formed in a region thereof corresponding to the bright dot defect portion; and the second substrate includes a light-collecting portion formed in a region thereof corresponding to the bright dot defect portion.

With such a configuration, the light-blocking portion of the first substrate prevents display light coming from the first substrate from being incident on the bright dot defect portion, thereby suppressing light leakage to the display surface, and the light-collecting portion formed in a region of the second substrate corresponding to the bright dot defect portion collects display light coming from around the light-blocking portion of the first substrate, whereby it is possible to reduce the area of the black dot to be seen on the display surface due to the light-blocking portion of the first substrate. Therefore, it is possible to desirably suppress the bright dot defect of the liquid crystal display panel.

In the liquid crystal display apparatus of the present invention, the light-collecting portion may be a concave lens provided with a concave surface thereof facing toward the display light exiting side.

With such a configuration, since the light-collecting portion is a concave lens provided with a concave surface thereof facing toward the display light exiting side, the image of the black dot to be collected on the display surface can be desirably reduced in size by being collected to the center of the bright dot.

In the liquid crystal display apparatus of the present invention, the concave lens may include a concave portion formed on a display light exiting surface of the second substrate, and a transparent coating formed on a surface of the concave portion.

With such a configuration, since the concave lens includes a concave portion formed on a display light exiting surface of the second substrate, and a transparent coating formed on a surface of the concave portion, the glass surface can be made smooth even if a process impression, or the like, of a drill, or the like, is left on the concave portion surface formed in the second substrate. Therefore, it is possible to desirably suppress the occurrence of scattered light when incident light is collected by the light-collecting portion.

In the liquid crystal display apparatus of the present invention, the concave portion may include: a first slope portion having a slope surface tapered in a direction from a display surface side of the second substrate toward an inside of the liquid crystal display panel; and a second slope portion having a slope surface steeper than that of the first slope portion, the slope surface of the second slope portion extending from its base end located at a tip portion of the first slope portion and being tapered in a direction from the tip portion toward an inside of the liquid crystal display panel.

With such a configuration, when the concave lens is produced by supplying a transparent coating material into the concave portion, the transparent coating material flows into the second slope portion because of the presence of the second slope portion having a slope surface steeper than that of the first slope portion, the slope surface of the second slope portion extending from its base end located at a tip portion of the first slope portion and being tapered in a direction from the tip portion toward an inside of the liquid crystal display panel. Therefore, it is possible to easily and desirably produce a concave lens having a smoothly concave center.

In the liquid crystal display apparatus of the present invention, a depth from the display light exiting surface of the second substrate to a deepest portion of a surface of the transparent coating formed on the surface of the concave portion may be less than 0.2 mm.

In a case where there is, for example, a layer that is formed on the second substrate so as to cover the concave portion, e.g., a polarizer, when the display panel is depressurized, for example, in a manufacturing step, the air, or the like, in the void portion formed between the layer covering the concave portion and the concave portion expands, which may result in, for example, peeling-off of the layer covering the concave portion such as the polarizer. With such a configuration, however, since a depth from the display light exiting surface of the second substrate to a deepest portion of a surface of the transparent coating formed on the surface of the concave portion may be less than 0.2 mm, the amount of expansion of the air in the void portion as described above is small, and it is possible to desirably suppress the occurrence of, for example, peeling-off of the layer covering the concave portion such as the polarizer.

In the liquid crystal display apparatus of the present invention, the concave lens may be covered by a polarizer formed on the display light exiting surface of the second substrate; and a void portion formed by the polarizer and the concave portion of the concave lens may be filled with a material whose refractive index is 0.5 or more smaller than that of a constituent material of the second substrate.

With such a configuration, since the concave lens is covered by a polarizer formed on the display light exiting surface of the second substrate; and a void portion formed by the polarizer and the concave portion of the concave lens is filled with a material whose refractive index is 0.5 or more smaller than that of a constituent material of the second substrate, the difference between the refractive index of the void portion formed by the polarizer and the concave portion of the concave lens and that of the constituent material of the second substrate is 0.5 or more. Therefore, the concave lens can have a desirable light-collecting function.

In the liquid crystal display apparatus of the present invention, the constituent material of the second substrate may be a transparent glass, and the material with which the void portion may be filled is a gas.

With such a configuration, since the constituent material of the second substrate is a transparent glass, and the material with which the void portion is filled is a gas, the difference between the refractive index of the void portion formed by the polarizer and the concave portion of the concave lens and that of the constituent material of the second substrate can easily be made to be 0.5 or more. Therefore, a desirable manufacturing efficiency is realized.

In the liquid crystal display apparatus of the present invention, the gas with which the void portion is filled may be air.

With such a configuration, since the gas with which the void portion is filled is air, it is possible to realize a desirable refractive index difference with respect to a glass being a typical material to be used for the second substrate. Moreover, it is not necessary to fill the void portion with a special material, but the void portion is filled naturally during the formation thereof, thereby presenting an advantage in terms of the manufacturing efficiency.

In the liquid crystal display apparatus of the present invention, the gas with which the void portion is filled may be an inert gas.

With such a configuration, since the gas with which the void portion is filled is an inert gas, it is possible to desirably suppress the chemical reaction, such as oxidization, between a member present around the void portion and the gas with which the void portion is filled.

In the liquid crystal display apparatus of the present invention, the inert gas may be a nitrogen gas.

With such a configuration, since the gas with which the void portion is filled is a nitrogen gas, it is possible to desirably suppress the chemical reaction, such as oxidization, between a member present around the void portion and the gas with which the void portion is filled.

In the liquid crystal display apparatus of the present invention, the constituent material of the second substrate may be a transparent glass, and the void portion may be a vacuum.

With such a configuration, since the constituent material of the second substrate is a transparent glass, and the void portion is a vacuum, the difference between the refractive index of the void portion formed by the polarizer and the concave portion of the concave lens and that of the constituent material of the second substrate can easily be made to be 0.5 or more. Therefore, a desirable manufacturing efficiency is realized.

In the liquid crystal display apparatus of the present invention, the constituent material of the second substrate may be a transparent glass, and the material with which the void portion is filled may be a solid.

With such a configuration, since the constituent material of the second substrate is a transparent glass, and the material with which the void portion is filled is a solid, it is possible to suppress the formation of a subsidence with the polarizer collapsing into the void portion when a load acts upon the polarizer.

In the liquid crystal display apparatus of the present invention, the solid material with which the void portion is filled may be an aerogel.

With such a configuration, the difference between the refractive index of the void portion formed by the polarizer and the concave portion of the concave lens and that of the constituent material of the second substrate can easily be made to be 0.5 or more. Therefore, a desirable manufacturing efficiency is realized.

In the liquid crystal display apparatus of the present invention, the transparent coating may be any of an epoxy resin, an acrylic resin, a fluorocarbon resin, a polymethyl methacrylate, a polycarbonate, a cycloolefin polymer, a polyimide, a styrene polymer, a polyethylene, and a polyethylene terephthalate.

With such a configuration, since the transparent coating is formed by a material typically used as an adhesive, it is possible to desirably form a transparent coating having a smooth surface on the concave portion.

In the liquid crystal display apparatus of the present invention, the light-blocking portion may have a slope surface tapered in a direction from a display light receiving side of the first substrate toward an inside of the liquid crystal display panel; and one of the first and second slope portions and the slope surface of the light-blocking portion may have the same slope angle.

With such a configuration, since the light-blocking portion has a slope surface tapered in a direction from a display light receiving side of the first substrate toward an inside of the liquid crystal display panel; and one of the first and second slope portions and the slope surface of the light-blocking portion have the same slope angle, the formation of the light-blocking portion in the first substrate and the formation of the light-collecting portion in the second substrate can be done by using the same machining drill, for example. Therefore, it is possible to use a simple manufacturing apparatus, and thus to realize a desirable manufacturing efficiency and a desirable manufacturing cost.

A process for manufacturing a liquid crystal display apparatus of the present invention includes the steps of: preparing a liquid crystal display panel including a first substrate provided on a display light receiving side, and a second substrate provided on a display light exiting side so as to oppose the first substrate with a liquid crystal material interposed therebetween, the liquid crystal display panel having a bright dot defect portion therein; forming a light-blocking portion in a region of the first substrate corresponding to the bright dot defect portion; and forming a light-collecting portion in a region of the second substrate corresponding to the bright dot defect portion.

With such a configuration, the light-blocking portion of the first substrate prevents display light coming from the first substrate from being incident on the bright dot defect portion, thereby suppressing light leakage to the display surface, and the light-collecting portion formed in a region of the second substrate corresponding to the bright dot defect portion collects display light coming from around the light-blocking portion of the first substrate, whereby it is possible to reduce the area of the black dot to be seen on the display surface due to the light-blocking portion of the first substrate. Therefore, it is possible to desirably suppress the bright dot defect of the liquid crystal display panel.

Effects of the Invention

As described above, according to the present invention, it is possible to provide a liquid crystal display apparatus in which a bright dot defect is desirably suppressed while reducing the size of a black dot occurring due to the repair of a bright dot defect, and a process for manufacturing the same.

DESCRIPTION OF REFERENCE NUMERALS

Figure 1:
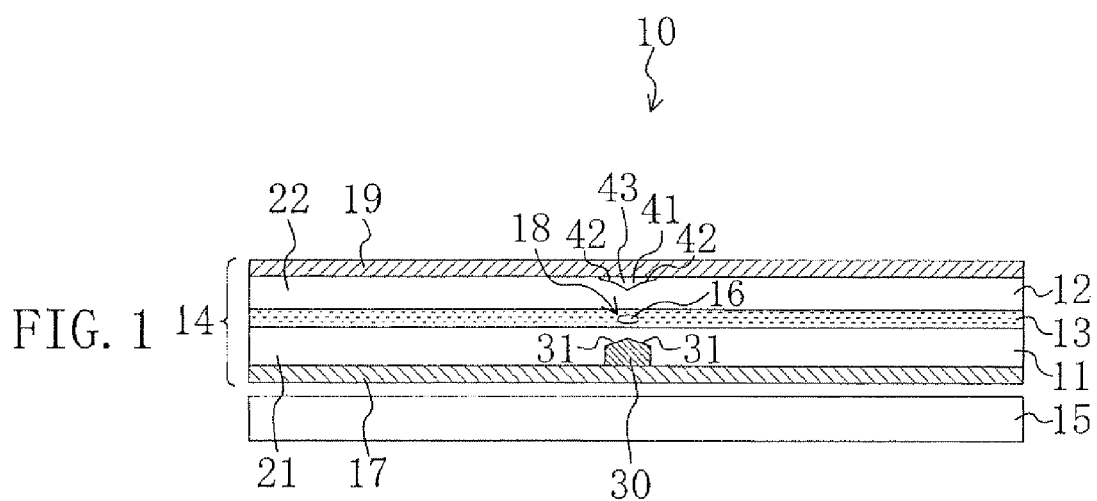
FIG. 1 is a cross-sectional view showing a liquid crystal display apparatus 10 according to an embodiment of the present invention.

10 Liquid crystal display apparatus
11 Thin film transistor substrate
12 Color filter substrate
13 Liquid crystal layer
14 Liquid crystal display panel
15 Backlight
16 Foreign particle
17 Back-side polarizer
18 Bright dot defect portion
19 Front-side polarizer
21, 22 Glass substrate
30 Light-blocking portion
31 Slope surface
40 Color layer
41 Light-collecting portion
42 Concave surface
43 Concave lens
44 Concave portion
45 Transparent coating
51 First slope portion
52 Second slope portion
53 First pupil
54 Second pupil
58 Void portion
60 Concave portion
61, 65 Light-blocking region
70, 100, 101 Black dot

BEST MODE FOR CARRYING OUT THE INVENTION

A liquid crystal display apparatus according to the embodiment of the present invention and a process for manufacturing the same will now be described in detail with reference to the drawings. Note that the present invention is not limited to the following embodiments.

EMBODIMENTS (Configuration of Liquid Crystal Display Apparatus 10)

FIG. 1 is a cross-sectional view showing a liquid crystal display apparatus 10. The liquid crystal display apparatus 10 includes a liquid crystal display panel 14, a backlight 15, etc., the liquid crystal display panel 14 including a thin film transistor substrate 11 (the first substrate) and a color filter substrate 12 (the second substrate) opposing each other, a liquid crystal layer 13 provided therebetween, column-shaped spacers (not shown) provided between the opposing substrates, etc.

While the bright dot defect is a bright dot defect due to the contamination of the liquid crystal layer 13 with a foreign particle 16 in the embodiment of the present invention, the bright dot defect is not limited to this, and may alternatively be a bright dot defect due to an alignment defect caused by the disturbance of an alignment film, or the like.

The thin film transistor substrate 11 includes a glass substrate 21, and other elements (not shown) formed on the glass substrate 21, including TFT elements such as the gate electrode, the source electrode and drain electrode, a transparent insulating layer, pixel electrodes, an alignment film, etc., with a back-side polarizer 17 being formed on the outer surface of the thin film transistor substrate 11.

The glass substrate 21 of the thin film transistor substrate 11 includes a light-blocking portion 30 formed in a region thereof corresponding to the position of a foreign particle in the liquid crystal layer 13 (a bright dot defect portion 18).

The light-blocking portion 30 is formed so as to cover the bright dot defect portion 18 as the glass substrate 21 is viewed in a direction normal to the panel 14 so that incident light (display light) from the backlight 15 placed on the back surface does not reach the bright dot defect portion 18. The light-blocking portion 30 is formed in a cylindrical shape extending in the thickness direction from the outer surface of the glass substrate 21. The light-blocking portion 30 is formed so that a tip portion thereof above a predetermined thickness-wise position of the glass substrate 21 has a gradually-decreasing diameter. In other words, the light-blocking portion 30 has a slope surface 31 tapered in the direction from the display light receiving side of the glass substrate 21 toward the inside of the liquid crystal display panel 14. The light-blocking portion 30 is formed by a light-blocking, e.g., black, resin, or the like.

The light-blocking portion 30 is not limited to the shape described above, but may be in any shape as long as it covers the bright dot defect portion 18 in the liquid crystal layer 13. The light-blocking portion 30 does not have to be formed on the outer surface of the glass substrate 21, but may be, for example, formed so as to be completely buried in the glass substrate 21.

The color filter substrate 12 includes a glass substrate 22, and color layers 40 of the three primary colors of red (R), green (G) and blue (B) formed thereon, which together form the display section. The color layers 40 may be of complementary colors of cyan, magenta and yellow, instead of the RGB combination. A counter electrode and an alignment film (not shown) are formed on the color layers 40. A black matrix as a framing for obtaining contrast is provided along the periphery of the color layers 40. The color filter substrate 12 includes a front-side polarizer 19 formed on the outer surface thereof.

The glass substrate 22 of the color filter substrate 12 includes a light-collecting portion 41 formed in a region thereof corresponding to the position of a foreign particle in the liquid crystal layer 13 (the bright dot defect portion 18).

The light-collecting portion 41 is a concave lens 43 provided so that a concave surface 42 thereof faces the output side of display light from the backlight 15 and so that the bright dot defect portion 18 is positioned at the central portion of the concave surface 42.

Figure 2:
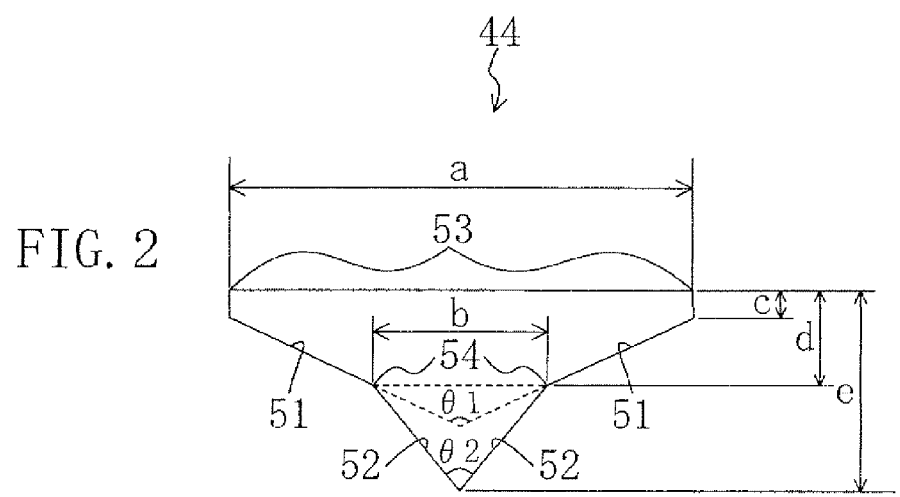
FIG. 2 is a cross-sectional view showing a concave portion 44 of a concave lens 43 according to the embodiment of the present invention.
Figure 3:
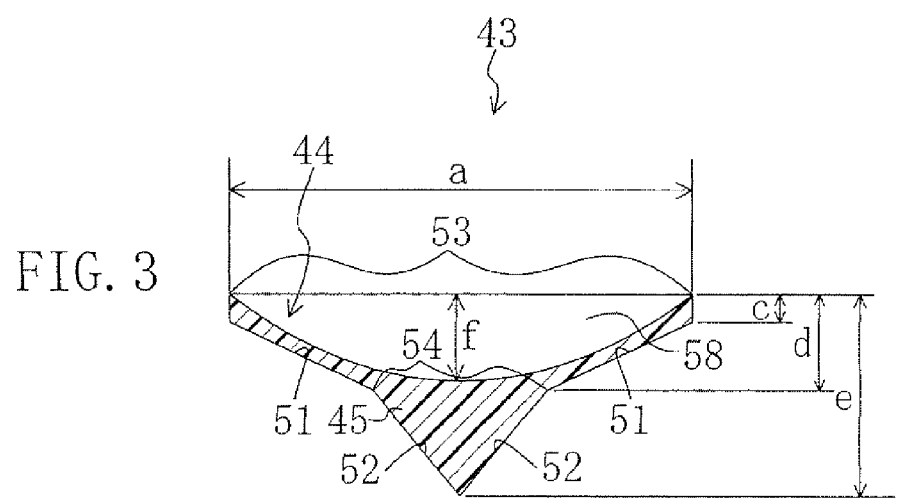
FIG. 3 is a cross-sectional view showing the concave lens 43 according to the embodiment of the present invention.

As shown in FIGS. 2 and 3, the concave lens 43 includes a concave portion 44 formed on the display light exiting surface of the color filter substrate 12, and a transparent coating 45 formed on the surface of the concave portion 44.

The concave portion 44 includes a first slope portion 51 having a slope surface tapered in the direction from the display surface side of the color filter substrate 12 toward the inside of the liquid crystal display panel 14, and a second slope portion 52 having a slope surface steeper than that of the first slope portion 51, the slope surface of the second slope portion 52 extending from its base end located at the tip portion of the first slope portion 51 and being tapered in the direction from the tip portion toward the inside of the liquid crystal display panel 14. In other words, as the glass substrate 22 is viewed from above, the concave portion 44 includes a large-circle first pupil 53 being the first slope portion 51, and a small-circle second pupil 54 being the second slope portion 52, the second pupil 54 being concentric with the first pupil 53. The first pupil 53 is formed so as to cover the light-blocking portion 30 of the thin film transistor substrate 11, as the glass substrate 22 is viewed from above. The base point of the first slope portion 51 does not have to be the surface of the glass substrate 22. For example, as shown in FIGS. 2 and 3, the base point may be below the surface by the thickness of the transparent coating 45.

The slope surface of the first slope portion 51 of the concave portion 44 and the slope surface of the light-blocking portion 30 formed in the thin film transistor substrate 11 are formed so that they have the same slope angle as seen in their cross sections.

An example of the size of the concave lens 43 that is optimal for reducing the size of the black dot produced by the light-blocking portion 30 is shown in FIGS. 2 and 3.

In the concave lens 43 shown in FIGS. 2 and 3, the diameter a of the first pupil 53 of the first slope portion 51 is about 0.5 mm, and the diameter b of the second pupil 54 of the second slope portion 52 is about 0.3 mm. The base point of the first slope portion 51 is set at the depth c of about 0.083 mm from the surface of the glass substrate 22, and the base point of the second slope portion 52 is set at the depth d of about 0.2 mm from the surface of the glass substrate 22. The tip of the second slope portion 52 is set at the depth e of about 0.27 mm from the surface of the glass substrate 22. The slope angle $\theta 1$ of the slope surface of the first slope portion 51 of the concave portion 44 as seen in its cross section is about 130°, and the slope angle $\theta 2$ of the slope surface of the second slope portion 52 as seen in its cross section is about 75°.

As shown in FIG. 3, the depth f from the surface of the glass substrate 22 to the surface of the transparent coating 45 formed on the concave portion 44 of the concave lens 43 is set to be about 0.138 mm.

The slope surface 31 of the light-blocking portion 30 and the slope surface of the second slope portion 52 of the concave portion 44 may be formed so that they have the same slope angle as seen in their cross sections.

The transparent coating 45 is formed on the surface of the concave portion 44. The transparent coating 45 is formed by an epoxy resin. The transparent coating 45 is not limited to an epoxy resin, but any of an acrylic resin, a fluorocarbon resin, a polymethyl methacrylate, a polycarbonate, a cycloolefin polymer, a polyimide, a styrene polymer, a polyethylene, and a polyethylene terephthalate, for example, may be used as the constituent material.

The depth from the display light exiting surface of the color filter substrate 12 to the deepest portion of the surface of the transparent coating 45 formed on the surface of the concave portion 44 is set to be less than 0.2 mm.

The concave lens 43 is covered by the front-side polarizer 19 formed on the display light exiting surface of the color filter substrate 12, and a void portion 58 formed by the front-side polarizer 19 and the concave portion 44 of the concave lens 43 is filled with the air. In this case, the difference between the refractive index of the glass (refractive index: about 1.5) of the color filter substrate 12 and that of the air (refractive index about 1.0) filling the void portion 58 is about 0.5.

The filling in the void portion 58 does not have to be the air, but may be anything as long as it is a material whose refractive index is 0.5 or more smaller than that of the glass being the constituent material of the color filter substrate 12. For example, it may be an inert gas such as nitrogen, another gas, or a liquid.

The void portion may be filled with a solid such as an aerogel. An aerogel is obtained by jellifying silicon dioxide and then drying it under a high-temperature, high-pressure, supercritical condition. Despite its low density being 3 times that of the air and its transparency as high as that of a glass, an aerogel is a material of a very small refractive index (refractive index: about 1.01 to 1.06), and surrounding objects are not substantially reflected on its surface. The aerogel is not limited to any particular type, but may be a silica aerogel, a carbon aerogel, an alumina aerogel, or the like.

The void portion may be filled with nothing, i.e., a vacuum. If the void portion is a vacuum, the refractive index thereof will be 1.0, which is 0.5 or more smaller than that of the glass being constituent material of the color filter substrate 12.

Even where the constituent material of the color filter substrate 12 is a non-glass material such as a plastic, the material to fill the void portion 58 is preferably a material whose refractive index is 0.5 or more smaller than that of the constituent material of the color filter substrate 12.

In the present embodiment, an epoxy resin is present between the glass substrate 22 and the air of the void portion 58, and the refractive index difference is therefore large (since the refractive index of the glass is 1.5 and the refractive index of the epoxy is 1.6, the refractive index difference with respect to the air is 0.6).

The concave lens 43 does not have to be formed on the outer surface of the glass substrate 22, but may be, for example, formed so as to be completely buried in the glass substrate 22.

There may be a plurality of the bright dot defect portions 18, and in such a case, the light-blocking portion 30 and the light-collecting portion 41 are formed at each of the positions on the glass substrates 21 and 22 corresponding to the bright dot defect portions 18.

The backlight 15 is provided on one side of the liquid crystal display panel 14 that is closer to the thin film transistor substrate 11. The backlight 15 includes a light source (not shown), a light guide plate (not shown) for receiving light that is output from the light source and outputting the light toward the liquid crystal display panel 14 while allowing the light to propagate therethrough, and a reflector (not shown) for reflecting light that is output from the back surface of the light guide plate toward the light guide plate.

While the refractive indices are values measured when light having a wavelength of about 589.3 nm is output from the backlight in the embodiment described above, the light output from the backlight is not limited to such a wavelength.

(Process for Manufacturing Liquid Crystal Display Apparatus 10)

Next, a process for manufacturing the liquid crystal display apparatus 10 of the present embodiment will be described in detail with reference to the drawings.

Figure 4:
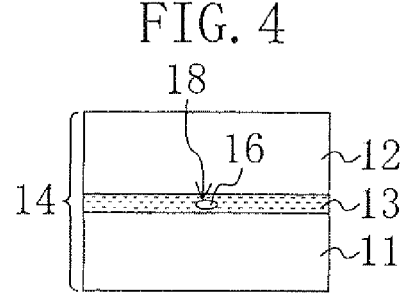
FIG. 4 is a cross-sectional view showing a liquid crystal display panel 14 in the step of identifying a bright dot defect position according to the embodiment of the present invention.

First, the liquid crystal display panel 14 in which the liquid crystal layer 13 is contaminated with the foreign particle 16 as shown in FIG. 4 is irradiated with light of the backlight 15 from the side of the thin film transistor substrate 11 to check the position of light leakage.

Then, a region on the outer surface of the thin film transistor substrate 11 corresponding to the position of light leakage is marked to thereby identify the bright dot defect portion 18.

Figure 5:
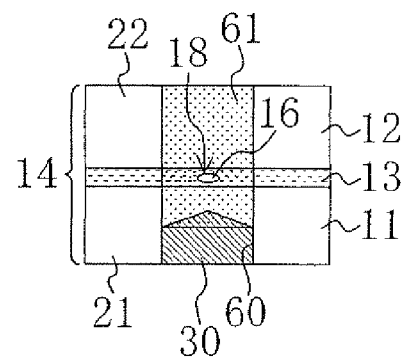
FIG. 5 is a cross-sectional view showing the liquid crystal display panel 14 in the step of forming a light-blocking portion 30 according to the embodiment of the present invention.

Then, as shown in FIG. 5, a concave portion 60 is formed on one surface of the thin film transistor substrate 11 of the liquid crystal display panel 14 that is away from the liquid crystal layer 13, in a region corresponding to the bright dot defect portion 18, i.e., at a position such that the bright dot defect portion 18 is covered so that incident light (display light) from the backlight 15 placed on the back surface does not reach the bright dot defect portion 18.

The concave portion 60 is formed in a boring process by pressing the tip portion of a penpoint as penpoint means equipped with a diamond head against the surface of the glass substrate 21. It is preferred that the penpoint has a sharp tip.

Then, a black resin as a light-blocking material is supplied into the concave portion 60, and is cured by heating it, by leaving it at room temperature, etc., to thereby form the light-blocking portion 30. When display light from the backlight 15 is made to be incident from the back surface side of the thin film transistor substrate 11 in which the light-blocking portion 30 has been thus formed, the incident light is blocked, and there appears a light-blocking region 61 in the liquid crystal display panel 14 as shown in FIG. 5.

Then, the light-collecting portion 41 being the concave lens 43 is formed in a region of the glass substrate 22 of the color filter substrate 12 corresponding to the bright dot defect portion 18 in the liquid crystal layer 13.

Figure 6:
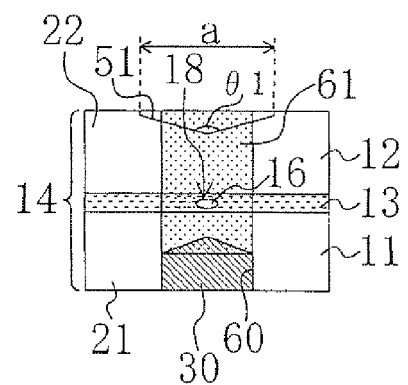
FIG. 6 is a cross-sectional view showing the liquid crystal display panel 14 in the step of forming a first slope portion 51 according to the embodiment of the present invention.

The concave lens 43 is produced by first forming the first slope portion 51 having a slope surface tapered in the direction from the display surface side of the color filter substrate 12 toward the inside of the liquid crystal display panel 14, as shown in FIG. 6. The first slope portion 51 is formed by a boring process using the penpoint equipped with a diamond head used when forming the light-blocking portion 30 in the thin film transistor substrate 11.

Figure 7:
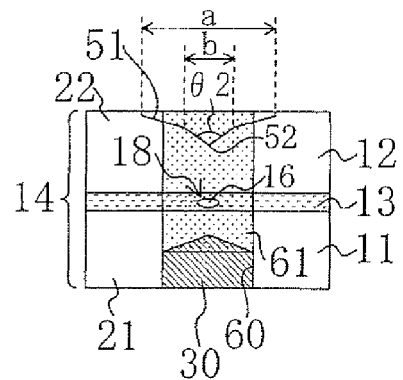
FIG. 7 is a cross-sectional view showing the liquid crystal display panel 14 in the step of forming a second slope portion 52 according to the embodiment of the present invention.

Then, as shown in FIG. 7, there is formed the second slope portion 52 having a slope surface steeper than that of the first slope portion 51, the slope surface of the second slope portion 52 extending from its base end located at the tip portion of the first slope portion 51 and being tapered in the direction from the tip portion toward the inside of the liquid crystal display panel 14. The second slope portion 52 is formed by a boring process using a penpoint whose tip is sharper than that of the penpoint means equipped with a diamond head used when forming the first slope portion 51.

Figure 8:
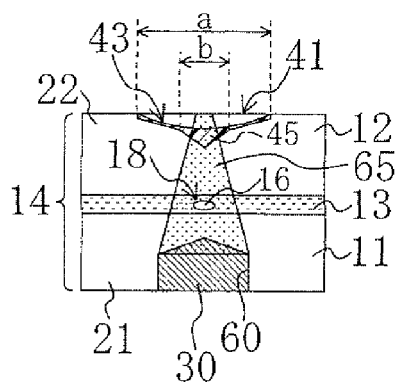
FIG. 8 is a cross-sectional view showing the liquid crystal display panel 14 in the step of forming a transparent coating 45 according to the embodiment of the present invention.

Then, a predetermined amount of an epoxy resin, for example, is supplied into the concave portion 44 and is cured to form the transparent coating 45. The epoxy resin is supplied in such an amount that a portion thereof falls into the second slope portion 52 to form the concave lens 43 having the concave surface 42 shown in FIG. 8. When the epoxy resin is supplied, the resin may be wiped by a wiper, or the like, so as to remove an excessive resin or to form the concave surface 42 of a more appropriate depth. When display light from the backlight 15 is incident on the side of the thin film transistor substrate 11, the incident light is refracted by the concave lens 43 formed as described above so as to be collected to the center of the concave lens 43, thereby forming a light-blocking region 65 as shown in FIG. 8.

Figure 9:
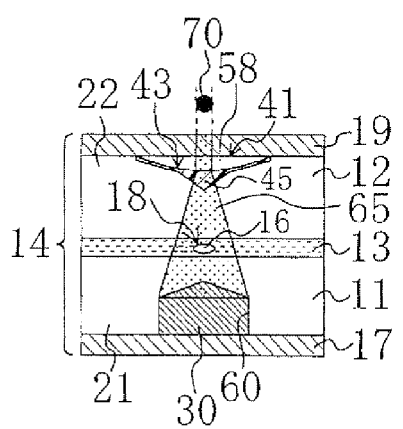
FIG. 9 is a cross-sectional view showing the liquid crystal display panel 14 in the step of forming a polarizer according to the embodiment of the present invention.

Then, as shown in FIG. 9, the back-side polarizer 17 and the front-side polarizer 19 are formed on the surface of the thin film transistor substrate 11 and on the surface of the color filter substrate 12, respectively. In this process, the void portion 58 formed by the front-side polarizer 19 and the concave portion 44 of the concave lens 43 is filled with the air. With the liquid crystal display panel 14 produced as described above, incident light from the backlight 15 is blocked by the light-blocking portion 30 so that the bright dot defect portion 18 in the liquid crystal layer 13 is in a light-blocking region, thereby preventing light leakage from appearing on the display surface, and the light-blocking region is collected by the concave lens 43 to the center of the concave lens 43, thereby reducing the size of a black dot 70 as seen on the display surface.

EXAMPLES

Evaluation Test 1

(Production of Liquid Crystal Display Panel for Evaluation)

An evaluation test for examining the reduction in size of the bright dot defect on the liquid crystal display panel was performed by using the same process as illustrated in the embodiment above.

In the step of manufacturing the liquid crystal display apparatus 10 shown in FIG. 4, the glass substrate 22 of the color filter substrate 12 was a substrate having a thickness of 0.7 mm, and the liquid crystal layer 13 was provided with a thickness of 3 µm.

In the step of forming the light-blocking portion 30 shown in FIG. 5, the light-blocking portion 30 was provided with a depth of 0.4 mm and a width of 0.4 mm.

In the step of forming the first slope portion 51 shown in FIG. 6, the depth from the surface of the glass substrate 22 to the deepest position of the first slope portion 51 was set to 0.2 mm, the slope angle of the first slope portion 51 was set to 130°, and the diameter of the first pupil 53 was set to 0.45 mm.

In the step of forming the second slope portion 52 shown in FIG. 7, the depth from the surface of the glass substrate 22 to the deepest position of the second slope portion 52 was set to 0.25 mm, the slope angle of the second slope portion 52 was set to 75°, and the diameter of the second pupil 54 was set to 0.3 mm.

In the step of supplying a transparent resin shown in FIG. 8, the depth of the deepest position of the void portion was set to 0.138 mm. Thus, a liquid crystal display panel of the present example was produced.

Separately, another liquid crystal display panel was produced, as a comparative example, where the light-blocking portion 30 as described above was formed in the thin film transistor substrate 11, but where the light-collecting portion 41 was not formed in the color filter substrate 12.

(Evaluation Results)

Figure 10:
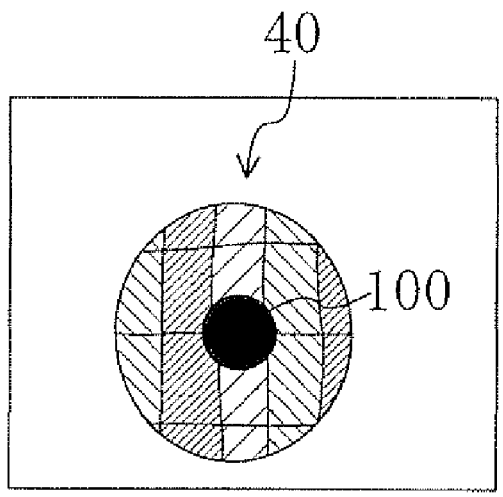
FIG. 10 is a plan view showing an image of a black dot 100 according to a comparative example of the present invention.
Figure 11:
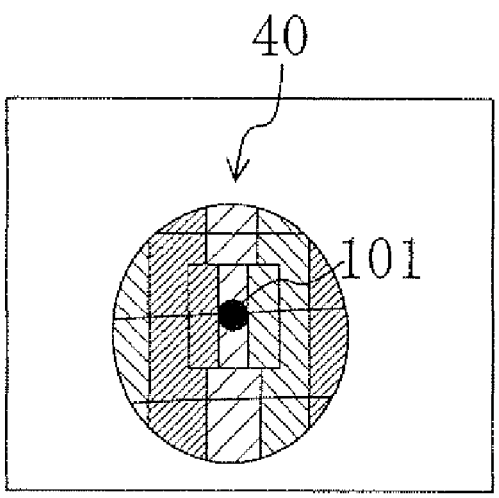
FIG. 11 is a plan view showing an image of a black dot 101 according to an example of the present invention.

Display light from the backlight was made to be incident on the liquid crystal display panel of the present example and the liquid crystal display panel of the comparative example produced as described above. The liquid crystal display panel of the comparative example was observed with a black dot 100 on the display surface having substantially the same width as that of the light-blocking portion, as shown in FIG. 10. In contrast, the liquid crystal display panel of the present example was observed with a black dot 101 of a reduced size on the display surface as being collected to the central portion of the concave lens, as shown in FIG. 11.

(Functions and Effects)

Functions and effects will now be described.

The liquid crystal display apparatus 10 of the present embodiment includes the liquid crystal display panel 14 including the thin film transistor substrate 11 provided on the display light receiving side, and the color filter substrate 12 provided on the display light exiting side so as to oppose the thin film transistor substrate 11 with a liquid crystal material interposed therebetween, the liquid crystal display panel 14 having the bright dot defect portion 18 therein, wherein the thin film transistor substrate 11 includes the light-blocking portion 30 formed in a region thereof corresponding to the bright dot defect portion 18, and the color filter substrate 12 includes the light-collecting portion 41 formed in a region thereof corresponding to the bright dot defect portion 18.

With such a configuration, the light-blocking portion 30 of the thin film transistor substrate 11 prevents display light coming from the thin film transistor substrate 11 from being incident on the bright dot defect portion 18, thereby suppressing light leakage to the display surface, and the light-collecting portion 41 formed in a region of the color filter substrate 12 corresponding to the bright dot defect portion 18 collects display light coming from around the light-blocking portion 30 of the thin film transistor substrate 11, whereby it is possible to reduce the area of the black dot to be seen on the display surface due to the light-blocking portion 30 of the thin film transistor substrate 11. Therefore, it is possible to desirably suppress the bright dot defect of the liquid crystal display panel 14.

INDUSTRIAL APPLICABILITY

As described above, the present invention is applicable to a liquid crystal display apparatus and a process for manufacturing the same.

The invention claimed is:

1. A liquid crystal display apparatus, comprising:
   a liquid crystal display panel including a first substrate provided on a display light receiving side, and a second substrate provided on a display light exiting side so as to oppose the first substrate with a liquid crystal material interposed therebetween, the liquid crystal display panel having a bright dot defect portion therein, wherein
   the first substrate includes a light-blocking portion formed in a region thereof corresponding to the bright dot defect portion; and
   the second substrate includes a light-collecting portion formed in a region thereof corresponding to the bright dot defect portion, and wherein the light-collecting portion comprises a transparent coating and a concave surface facing toward the display light exiting side.

2. A liquid crystal display apparatus, comprising:
   a liquid crystal display panel including a first substrate provided on a display light receiving side, and a second substrate provided on a display light exiting side so as to oppose the first substrate with a liquid crystal material interposed therebetween, the liquid crystal display panel including a bright dot defect portion therein, wherein
   the first substrate includes a light-blocking portion formed in a region thereof corresponding to the bright dot defect portion;
   the second substrate includes a light-collecting portion formed in a region thereof corresponding to the bright dot defect portion; and
   wherein the light-collecting portion is a concave lens provided with a concave surface thereof facing toward the display light exiting side.

3. The liquid crystal display apparatus of claim 2, wherein the concave lens includes a concave portion formed on a display light exiting surface of the second substrate, and a transparent coating formed on a surface of the concave portion.

4. The liquid crystal display apparatus of claim 3, wherein the concave portion includes
   a first slope portion having a slope surface tapered in a direction from a display surface side of the second substrate toward an inside of the liquid crystal display panel; and
   a second slope portion having a slope surface steeper than that of the first slope portion, the slope surface of the second slope portion extending from its base end located at a tip portion of the first slope portion and being tapered in a direction from the tip portion toward an inside of the liquid crystal display panel.

5. The liquid crystal display apparatus of claim 3, wherein a depth from the display light exiting surface of the second substrate to a deepest portion of a surface of the transparent coating formed on the surface of the concave portion is less than 0.2 mm.

6. The liquid crystal display apparatus of claim 3, wherein the concave lens is covered by a polarizer formed on the display light exiting surface of the second substrate; and a void portion formed by the polarizer and the concave portion of the concave lens is filled with a material whose refractive index is 0.5 or more smaller than that of a constituent material of the second substrate.

7. The liquid crystal display apparatus of claim 6, wherein the constituent material of the second substrate is a transparent glass, and the material with which the void portion is filled is a gas.

8. The liquid crystal display apparatus of claim 7, wherein the gas with which the void portion is filled is air.

9. The liquid crystal display apparatus of claim 7, wherein the gas with which the void portion is filled is an inert gas.

10. The liquid crystal display apparatus of claim 9, wherein the inert gas is a nitrogen gas.

11. The liquid crystal display apparatus of claim 6, wherein the constituent material of the second substrate is a transparent glass, and the void portion is a vacuum.

12. The liquid crystal display apparatus of claim 6, wherein the constituent material of the second substrate is a transparent glass, and the material with which the void portion is filled is a solid.

13. The liquid crystal display apparatus of claim 12, wherein the solid material with which the void portion is filled is an aerogel.

14. The liquid crystal display apparatus of claim 3, wherein the transparent coating is any of an epoxy resin, an acrylic resin, a fluorocarbon resin, a polymethyl methacrylate, a polycarbonate, a cycloolefin polymer, a polyimide, a styrene polymer, a polyethylene, and a polyethylene terephthalate.

15. The liquid crystal display apparatus of claim 4, wherein the light-blocking portion has a slope surface tapered in a direction from a display light receiving side of the first substrate toward an inside of the liquid crystal display panel; and
one of the first and second slope portions and the slope surface of the light-blocking portion have the same slope angle.

16. A process for manufacturing a liquid crystal display apparatus, the process comprising:
preparing components of a liquid crystal display panel including a first substrate to be provided on a display light receiving side, and a second substrate to be provided on a display light exiting side so as to oppose the first substrate with a liquid crystal material interposed therebetween, the liquid crystal display panel having a bright dot defect portion therein;
forming a light-blocking portion in a region of the first substrate corresponding to the bright dot defect portion; and
forming a light-collecting portion in a region of the second substrate corresponding to the bright dot defect portion in making the liquid crystal display panel, and wherein the light-collecting portion comprises a concave lens provided with a concave surface thereof facing toward the display light exiting side.

* * * * *